(12) United States Patent
Fangauer et al.

(10) Patent No.: US 10,692,636 B2
(45) Date of Patent: Jun. 23, 2020

(54) ELECTROMAGNETIC ACTUATOR DEVICE AND SYSTEM COMPRISING SAME

(71) Applicant: ETO Magnetic GmbH, Stockach (DE)

(72) Inventors: Philipp Fangauer, Constance (DE); Jörg Bürssner, Engen (DE)

(73) Assignee: ETO Magnetic GmbH, Stockach (DE)

( * ) Notice: Subject to any disclaimer, the term of this patent is extended or adjusted under 35 U.S.C. 154(b) by 201 days.

(21) Appl. No.: 15/761,203

(22) PCT Filed: Aug. 3, 2016

(86) PCT No.: PCT/EP2016/068547
§ 371 (c)(1),
(2) Date: Mar. 19, 2018

(87) PCT Pub. No.: WO2017/045835
PCT Pub. Date: Mar. 23, 2017

(65) Prior Publication Data
US 2018/0268977 A1    Sep. 20, 2018

(30) Foreign Application Priority Data

Sep. 17, 2015    (DE) .......................... 10 2015 115 684

(51) Int. Cl.
*H01F 7/00*     (2006.01)
*H01F 7/08*     (2006.01)
(Continued)

(52) U.S. Cl.
CPC ......... *H01F 7/081* (2013.01); *F16K 31/0675* (2013.01); *F16K 31/082* (2013.01);
(Continued)

(58) Field of Classification Search
CPC ... H01F 7/08; H01F 7/129; H01F 7/02; H01F 7/121
(Continued)

(56) References Cited

U.S. PATENT DOCUMENTS

| | | | |
|---|---|---|---|
| 2014/0062628 A1* | 3/2014 | Buerssner | H01F 7/08 335/229 |
| 2015/0213936 A1* | 7/2015 | Burner | F01L 13/0036 123/90.17 |

(Continued)

FOREIGN PATENT DOCUMENTS

| | | |
|---|---|---|
| CN | 2667261 Y | 12/2004 |
| DE | 10240774 A1 | 4/2003 |

(Continued)

OTHER PUBLICATIONS

International search report for patent application No. PCT/EP2016/068547 dated Nov. 23, 2016.

(Continued)

*Primary Examiner* — Shawki S Ismail
*Assistant Examiner* — Lisa N Homza
(74) *Attorney, Agent, or Firm* — Bachman and Lapointe PC; George Coury

(57)    ABSTRACT

An electromagnetic actuator device has at least one stationary spool unit (4), which can be energized, and at least one armature unit (7), movable along a displacement axis (V) and with respect to the spool unit (4) in reaction to the spool unit (4) being energized. The armature unit (7) can be displaced between a parked position and an actuating position in an output drive direction along the displacement axis (V) in order to interact with an actuating element, which can be a camshaft disposed on the output side of the armature unit (7), and can be rotated about the displacement axis (V). A spring member (14) supported against an abutment component (16) is preferably disposed in a torque-proof manner and allocated to the armature unit (7) in such a manner that the spring member (14) applies a spring force to the armature unit (7) during a displacing movement in the output drive direction while simultaneously at least partially relaxing and applying a spring force to the armature unit (7) when (Continued)

in the actuating position. It is intended that the spring member is supported against the abutment component (16) by a rotation decoupling member (15) for decoupling a rotational movement of the armature unit (7) from the spring member (14) about the displacement axis (V) at the armature unit (7) and/or for decoupling a rotational movement of the spring member (14) about the displacement axis (V) from the abutment component (16).

15 Claims, 3 Drawing Sheets

(51) Int. Cl.
*H01F 7/16* (2006.01)
*F16K 31/08* (2006.01)
*F16K 31/06* (2006.01)
*H01F 7/02* (2006.01)
*H01F 7/121* (2006.01)
*H01F 7/129* (2006.01)
*F01L 13/00* (2006.01)

(52) U.S. Cl.
CPC ............... *H01F 7/02* (2013.01); *H01F 7/121* (2013.01); *H01F 7/129* (2013.01); *H01F 7/1646* (2013.01); *F01L 2013/0052* (2013.01); *F01L 2013/101* (2013.01); *H01F 2007/086* (2013.01)

(58) Field of Classification Search
USPC .......................................................... 335/229
See application file for complete search history.

(56) References Cited

U.S. PATENT DOCUMENTS

| | | | |
|---|---|---|---|
| 2017/0037768 A1* | 2/2017 | Fangauer | F16K 17/048 |
| 2017/0321689 A1* | 11/2017 | Fangauer | F04B 27/18 |
| 2019/0043648 A1* | 2/2019 | Vincon | F01L 1/047 |
| 2019/0122798 A1* | 4/2019 | Fangauer | H01F 7/122 |

FOREIGN PATENT DOCUMENTS

| | | |
|---|---|---|
| DE | 102006051809 A1 | 5/2008 |
| DE | 102007024598 A1 | 11/2008 |
| DE | 102007052252 A1 | 5/2009 |
| DE | 102009015833 A1 | 10/2010 |
| DE | 102012107281 A1 | 2/2014 |
| DE | 102012107922 A1 | 3/2014 |
| DE | 202013105776 U1 | 3/2015 |
| DE | 102014109124 A1 | 12/2015 |

OTHER PUBLICATIONS

German office action for patent application No. 10 2015 115 684.9 dated Jul. 12, 2016.

* cited by examiner

ELECTROMAGNETIC ACTUATOR DEVICE AND SYSTEM COMPRISING SAME

BACKGROUND OF THE INVENTION

The invention relates to a, preferably bistable, electromagnetic actuator device, preferably comprising permanent magnet means, having a stationary spool unit, which can be energized, as well as an armature unit, which is movably guided along a displacement axis and which is movable with respect to the spool unit in reaction to the spool unit being energized, said armature unit consisting of one or several parts being able to be displaced between a parked position (preferably a first or rather inner stable position) and an actuating position (preferably a second or rather extracted stable position) in an output drive direction along a displacement axis in order to interact with an actuating element, which can in particular be a camshaft preferably comprising a displacement groove and which is disposed on an output side of the armature device, as well as being able to be rotated about the displacement axis, and spring means, which are supported against an abutment component preferably disposed in a torque-proof manner, being allocated to said armature unit in such a manner that said spring means apply a spring force to the armature unit in the output drive direction during the displacing movement while simultaneously partially relaxing and preferably apply a spring force to the armature unit when in the actuating position as well. Furthermore, the invention relates to a system which comprises an actuating element along with an electromagnetic actuator device, said actuating element applying a force, which rotates the armature unit about the displacement axis, to the armature unit when in its actuating position, which is in particular extracted from an actuator casing.

Electromagnetic actuating devices have long been known as actuators, in particular for a cam phasing unit or similar aggregates of a combustion engine, from the state of the art. Accordingly, the applicant's German patent DE 102 40 774, for example, discloses such a technology in which an armature unit comprising permanent magnet means forms a tappet or a tappet unit at its end in order to interact with an actuating element (such as an actuating groove of a cam shaft) and can be moved with respect to a stationary spool unit in reaction to the spool unit being energized. In practice, a repulsive magnetic field in reaction to the energizations is generated in such devices which removes the armature unit from a core from a parked position and drives the same to an engaging position (actuating position) with the actuating element in an output drive direction. Such devices, which are presumed to be known, are optimized not only electromagnetically and in regard of their dynamic behavior (development of force and speed) but are also particularly suitable in a proper manner for a large-scale production. The electromagnetic actuator device described in DE 102 40 774 can also be realized so as to be supported by a spring force in such a manner that the spring force supports the movement of the armature unit to the engaging position, the spring means required therefor being supported against the armature unit.

An alternative electromagnetic actuator device has been described in the applicant's patent DE 10 2012 107 922 A1, the armature unit of which also comprises a tappet or a tappet unit, respectively, at its end for interacting with an actuating element, in particular an actuating groove of a camshaft. In contrast to the technology described in DE 102 40 774, the armature unit does not comprise any permanent magnet means; like the spool unit, these permanent magnet means are disposed stationary and with respect to the spool unit in such a matter that the permanent magnetic flux is repelled from a section of the armature unit free of permanent magnets when energizing the spool unit so that this spring actuated by spring means is moved to an engaging position with the actuating partner in an output drive direction.

The two previously described embodiments of electromagnetic actuating devices for phasing a camshaft of a combustion engine have in common that the armature unit forms an actuating member of a cam phasing mechanism and engages in the groove of a camshaft when in its actuating position. Hence, the problem arises that the armature unit abuts against the flank of a groove during the process of axially displacing the camshaft and rolls off of there due to the rotational movement of the camshaft, whereby the armature unit first rotates in the one and then the other direction about its axial displacement axis during the process of displacing the camshaft. In a previously described actuator concept, which comprises spring means, which are supported against the armature unit on the one end and against a stationary abutment component on the other end and simultaneously exert a spring force on the rotating armature unit, this inevitably leads to an abrasion between the components rubbing against each other. In a worst case scenario, this effect can also lead to the spring means and the armature unit becoming wedged when the armature unit rotates against a winding direction of the spring means realized as, for example, a helical compression spring with the result that the spring means are unwound. Since only a comparatively low inherent rigidity of the spring leads to the desired displacement behavior of the armature unit in the previously described types of actuators, only springs having comparatively thin wire thickness, which are particularly susceptible to being unwound as previously described, can thus far be used with the given spatial construction requirements.

SUMMARY OF THE INVENTION

Starting from the aforementioned state of the art, the object of the invention is to improve generic electrical actuator devises, in particular for use in cam phasing systems, in such a manner that the abrasion of spring means, which axially drive the armature unit towards an actuating position, is reduced to a minimum despite a rotational movement of the armature unit induced by the actuating element as well as reducing the risk of unwinding the spring means to a minimum.

This object is attained by an electromagnetic actuator device having the features disclosed herein, i.e. in a generic actuator device by the spring means being supported (not directly but merely indirectly) against the armature unit by means of rotation decoupling means for decoupling a rotational movement of the armature movement from the spring means about the displacement axis and/or against the abutment component for decoupling a rotational movement of the spring means about the displacement axis from the abutment component.

Advantageous embodiments of the invention are described in the dependent claims. All combinations containing at least two features disclosed in the description, the claims and/or the figures are to be considered as pertaining to the scope of the invention.

The concept of the invention is to decouple a possible rotational movement of the armature unit about the displacement axis, caused in particular by an interaction with an actuating element, in particular the groove of a camshaft, from the spring means, which is to be done via, preferably rigid, rotation decoupling means, via which spring means are supported against the armature unit or the abutment component. Alternatively, the rotation decoupling means decouple a rotational movement of spring means rotating along with the armature unit (in particular with the armature-unit rotation speed) from the abutment component, preferably disposed in a torque-proof manner.

In other words, the spring means are not supported directly against the armature unit and the abutment component but rather rotation decoupling means are disposed between the spring means and at least one of the actuator components (armature unit and abutment component) according to the invention, said rotation decoupling means axially transferring the spring force and at least mostly preventing a rotational movement of the spring means depending on the embodiment and/or preventing a frictional abrasion of spring means rotating along with the armature unit and of the abutment component, in which rotation decoupling means are axially disposed between the spring means and the abutment component. By preventing the spring means from directly being supported against the armature unit and/or the abutment component according to the invention, a frictional abrasion of the spring means is reduced to a minimum and it is further avoided that the spring means, which are realized as helical compression springs, for example, are unwound, even if the armature unit rotates against the winding direction of the spring means, in particular actuated by a displacing movement of the actuating element of the actuator device, with respect to the stationary spool unit.

Particularly preferred, the electromagnetic actuator device is the actuator device of a cam phasing system of a motor vehicle, although the electromagnetic actuator device according to the invention is not limited to this usage; generally, the utilization of the actuator device is suitable for all usages in which the armature unit, consisting of one or several pieces and preferably realized as or comprising an oblong tappet, interacts with the actuating element when in its extracted position, preferably extracted from an actuator casing, said actuating element exerting a force which rotates the armature unit about its displacement axis, preferably formed from a longitudinal middle axis of the armature unit, due to which force the armature unit is rotated via a peripheral angle of in particular more than 10°, preferably more than 360°, with respect to the stationary components of the actuator device, in particular the spool unit and/or the pole core.

Preferably, the rotation decoupling means, at least their surface facing towards the armature unit or the abutment component, respectively, are made of a material having good sliding properties. Preferably, the rotation decoupling means should be made of a non-magnetic material in order to prevent a radial magnetic adhesion which could increase friction. It is conceivable to use brass or bronze alloys or stainless steels, such as 1.4305, the utilized working material being able to be coated for improving the sliding properties if necessary, for example with a PTFE coating.

With regard to the explicit embodiment of the electromagnetic actuator device, there are several possibilities. Hence, it is possible and preferred, as described in detail in DE 10 2012 107 922 A1, to provide stationary permanent magnet means in addition to the spool unit in such a manner that said permanent magnet means (stably) hold the armature unit in its parked position due to their permanent magnet force while the spool unit is not energized and that the permanent magnetic holding force is reduced by energizing the spool unit in particular by repelling the permanent magnet flux from an armature-unit section. When the permanent magnet force is reduced, the spring effect of the spring means comes to operation, owing to which the armature unit is displaced along the displacement axis in the output drive direction.

In this context according to the invention, the spring means are supported against the armature unit and/or an abutment component, in particular against a yoke section of the electromagnetic actuator device by means of rotation decoupling means. Alternatively, it is possible to realize the actuator device in principle as described in the applicant's patent DE 102 40 774, thus in such a manner that the permanent magnet means are disposed on the armature unit and can be displaced along with said armature unit. In this embodiment as well, the magnetic holding force of the permanent magnet means (stably) holds the armature unit in its parked position. By energizing the spool unit, an electromagnetic magnetic flux is generated, which flows in the opposite direction of the permanent magnetic flux and which moves the armature unit towards the actuating element along the displacement axis in the output drive direction. This displacing movement is supported by spring force by means of spring means, which are supported against the armature unit and/or against an abutment component, which is preferably disposed in a torque-proof manner and which is in particular a pole core, by means of rotation decoupling means.

Using the rotation decoupling means according to the invention in an embodiment of the electromagnetic actuator device is particularly advantageous, in which embodiment the spring means do not entirely relax by displacing the armature unit when the spring force is sufficiently large in order to displace the armature unit on its own or in a supportive manner to the actuating position but rather a residual pretension is also retained in the actuating position, by means of which the spring means even then are still axially supported via the rotation decoupling means. In particular in such an embodiment, the frictional abrasion without rotation decoupling means and the risk of the spring means becoming unwound would be particularly high. The invention, however, is not limited to this; generally the rotation decoupling means can be used in an embodiment of the actuator, in which the spring means are entirely relaxed when in the actuating position, and possibly axially via the rotation decoupling means due only to gravity, since in such an embodiment (without rotation decoupling means) the risk of the spring means snagging and thus unwinding is also present.

Particularly preferably, the rotation decoupling means are made of a magnetically non-conductive material.

One embodiment of the actuator device has proven to be particularly advantageous, in which a contact surface between the spring means and the rotation decoupling means is larger than the resting surface of the rotation decoupling means, by means of which these are supported against the armature unit or the abutment component. Overall, it is advantageous if a possible torque transferred from the armature unit to the rotation decoupling means when rotationally moving the armature unit is lesser than a holding torque or connecting torque, respectively, of the, in particular friction-type or form-fit, connection between the spring means and the rotation decoupling means.

One embodiment of the electromagnetic actuator device is particularly preferred, in which the rotation decoupling means comprise at least one sliding bearing element, which is preferably disposed in a torque-proof manner with respect to the spring means and which is supported against the armature unit or against the abutment component (using its resting surface, in particular axially with respect to the displacement axis). For this purpose, it is particularly advantageous if the sliding bearing element partially axially extends into the spring interior surrounded by the spring windings of the spring means when realizing the spring means as a helical compression spring. In the simplest and preferred instance, the spring means are fixed in a purely friction-type manner to the rotation decoupling means with respect to the rotational direction, a form-fit connection obviously being able to realized as well (additionally or alternatively).

In a further embodiment of the invention, it is advantageously intended that the sliding bearing element is realized in a sphere-like shape on a front side facing towards the armature unit or the abutment component and/or comprises a, at least almost, punctiform, thus a central, resting surface, preferably interspersed by the displacement axis, for being supported against the armature unit or the abutment component. Via the aforementioned measures it is achieved that a lever arm essentially does not arise when rotationally moving the armature unit with respect to the rotation decoupling means and consequently no or at most a very slight torque but rather only an axial force is transferred when the spring means are sufficiently pretensioned. The embodiment having a front side in a sphere-like shape and/or a punctiform resting surface has the same advantage in an embodiment, in which the rotation decoupling means are supported against the abutment component; in this instance essentially no or at most a slight torque is transferred from the rotation decoupling means to the abutment component when the spring means rotate along with the armature unit.

Generally, an embodiment of the rotation decoupling means is preferred in which the resting surface (contact surface of the rotation decoupling means, in particular of the sliding bearing element) is axially offset and disposed to the rotation decoupling means having a radial distance to a contact surface of the spring means.

In the alternative event of an essentially non-punctiform resting surface of the rotation decoupling means, it is possible to provide an annular or disc-shaped resting surface for being supported on the armature unit or the abutment component on the sliding bearing element, said resting surface also being disposed between the spring means and the sliding bearing element at an axial offset to a contact surface though said contact surface is disposed on the armature unit or the abutment component, respectively, having an additional radial distance outside of the resting surface of the sliding bearing element in order to safely attain a tighter connection to the spring means and the sliding bearing element which cannot be loosened by a possible torque acting between the armature unit and the resting surface of the sliding bearing element or between the abutment component and the resting surface of the sliding bearing element.

As previously mentioned in the introduction, it is particularly advantageous if the spring means comprise a helical compression spring being axially supported against the rotation decoupling means or is realized as such, it being particularly advantageous if the rotation decoupling means axially extend into a hollow space surrounded by the windings of the helical compression spring, in particular are clamped thereto by the spring means. For optimally guiding the spring means or for preventing a lateral evasion of the spring means, respectively, it is advantageous if the spring means are disposed within an axial channel of the armature unit and/or the abutment bearing at least in sections.

The invention also relates to a system comprising a, preferably bistable, electromagnetic actuator device according to the invention as well as to an actuating element which is realized so as to apply a force rotating the armature unit about its displacement axis to the armature unit when in its actuating position, in particular an actuating position extracted from an actuator casing.

Preferably, the system is a cam phasing system and the displacement element is a shaft, preferably comprising an engaging groove (actuating groove) for the armature unit, a force, which acts on the armature unit and rotates it about the displacement axis, being caused by means of the shaft rotating and the friction arising between the camshaft and the armature unit when in the actuating position.

BRIEF DESCRIPTION OF THE DRAWINGS

Other advantages, features and details of the invention can be derived from the following description of preferred exemplary embodiments as well as from the drawings. In the following.

In the figures, the same elements and elements having the same function are assigned the same reference numerals.

DETAILED DESCRIPTION

Figure 1:
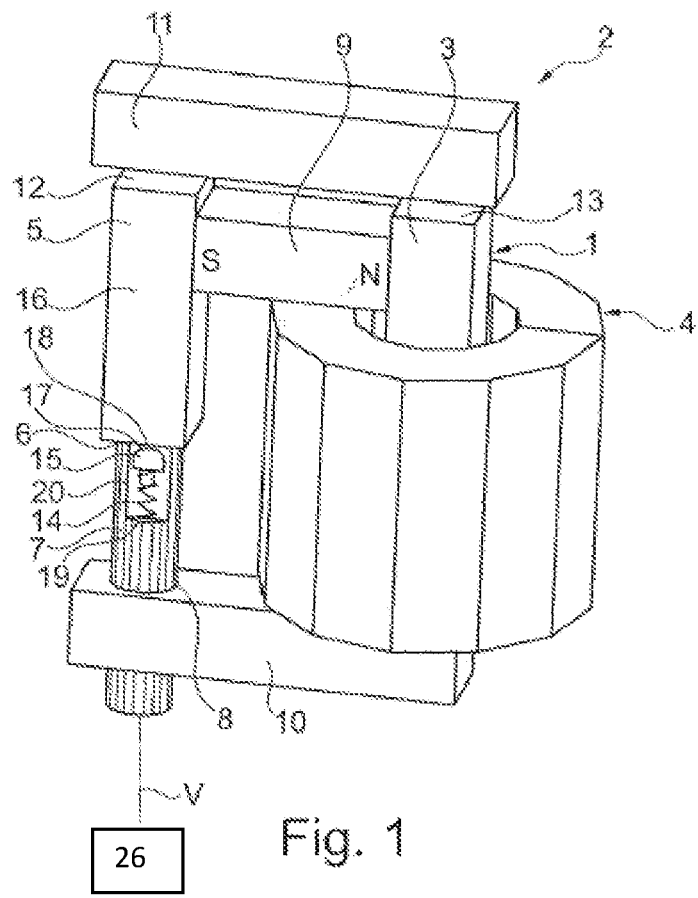
FIG. 1 illustrates a schematic view of a possible variation of an embodiment of an electromagnetic actuator device having stationary permanent magnets.

In FIG. 1, an electromagnetic actuator device 1, in particular for use in a cam phasing system, is illustrated. The electromagnetic actuator device 1 comprises a stationary bracket-shaped yoke unit 2, which comprises a first yoke section 3 extending vertically in FIG. 1, around which a stationary spool unit 4 is formed. Laterally adjacent to the first yoke section 3, another (second) yoke section 5 is disposed which axially interacts with an oblong actuator unit 7 via an air gap 6, said actuator unit 7 being able to be displaced along a displacement axis V.

The magnetic flux circuit of a permanent magnet section 9 (permanent magnet means) provided between the yoke sections 3 and 5 are in turn closed via an air gap 8 and via a frontal flux-conductor section 10, which connects the first yoke section 3 to the armature unit 7 (via the air gap 8). A magnetic shunt element 11 is disposed adjacent to the permanent magnet means 9 and provides space for a flux repulsion via suitable air gaps 12, 13 by energizing the spool unit 4.

A, preferably cylindrical, casing, from which the armature unit 7 projects in its actuating position (not illustrated) displaced with respect to the illustrated parked position for interacting with an actuating partner, in particular a camshaft 26, schematically illustrated for reasons of clarity.

With regard to the functionality of an electromagnetic actuator unit realized as described above, document DE 10 2012 107 922 A1 and in particular FIG. 7 of said document as well as the description of the figures of the embodiment according to FIGS. 1 to 6 are referred to.

As long as the spool unit is not energized or not sufficiently energized, the permanent magnetic flux flowing through the armature unit 7 provides a permanent magnetic holding force, which stably holds the armature unit 7. When the spool unit 4 is energized, the permanent magnetic magnet flux is consequently repelled into the shunt element 11 and the armature unit 7, actuated via spring means 14 exemplarily realized as a helical compression spring, is axially displaced from the parked position to a (stable) actuating position, which is displaced downward in the drawing plane and in which the armature unit interacts with an actuating element, preferably a camshaft, and a corresponding actuating groove preferred there in a familiar manner.

In order to enable this, the spring means 14 are axially supported, directly in this instance (at the bottom of the drawing), for example, against the armature unit 7 and indirectly, namely via a rotation decoupling means 15 realized as a sliding bearing element, against a stationary abutment component, which is disposed in a torque-proof manner and which is realized by the second yoke section 5 in an exemplary manner in this instance.

It can be seen that the rotation decoupling means 15, specifically the sliding bearing element, are/is formed in a sphere-like shape on a front side 17 facing towards the abutment component 16 and consequently form(s) an essentially punctiform central resting surface 18, by means of which the rotation decoupling means 15 are axially supported against the abutment component 16. The punctiform resting surface is interspersed by the displacement axis V so as to not transfer essentially any torque between the rotation decoupling means 15, which rotate along with the armature unit 7 and the spring means 14, and the abutment component 16 arranged in a torque-proof manner, as will be further described further on. In a not illustrated alternative embodiment, another rotation decoupling means, in particular another sliding bearing element, can be axially provided between the spring means 14 and the armature unit 7, in particular a bore ground of a frontal blind bore 20 in the armature unit 7, in addition to the rotation decoupling means 15. Moreover, an alternative embodiment can be realized, in which instead of the rotation decoupling means 15, said rotation decoupling means 15 are arranged between the spring means 14 and the armature unit 7, preferably the bore ground 19. In the latter instance, essentially no torque is transferred onto the rotation decoupling means 15 and thus the spring means 14 by rotating the camshaft when in the actuating position, said spring means 14 then also being arranged in a torque-proof manner owing to the friction-type support against the abutment component 16 arranged in a torque-proof manner, i.e. not rotating along with the armature unit 7.

Figure 2:
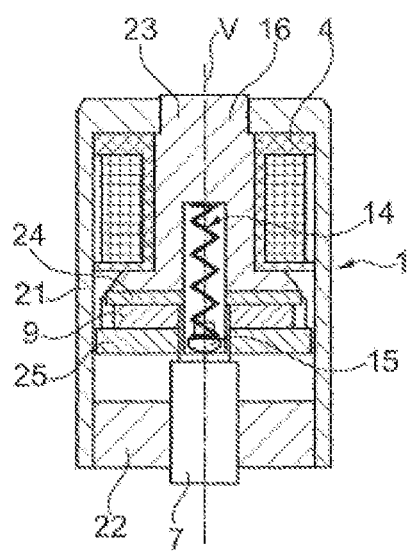
FIG. 2 illustrates an alternative electromagnetic actuator device according to the invention in conjunction with permanent magnets which can be displaced along with the armature unit.

In FIG. 2, an alternative embodiment of an electromagnetic actuator device 1 is illustrated. This electromagnetic actuator device 1 comprises permanent magnet means 9, which are disposed on an armature unit 7 displaceable along a displacement axis V and which can be displaced along with the spool unit 7 with respect to a stationary spool unit 4, namely by means of the spool unit 4 to be energized. This causes a repelling force to act on the armature unit 7, said repelling force displacing the armature unit 7 from the illustrated parked position along the displacement axis V and the drawing plane downward to an actuating position extracted from a casing 21 despite the holding force exerted by the permanent magnet means 9 when in the parked position. The casing 21 itself is flux-conductive. Further components of the magnetic flux circuit form the yoke 22 interspersed by the armature unit 7 as well as a pole core 23, which is surrounded by the spool unit 4. It can be seen that the permanent magnet means 9 are received between two pole disks 24, 25 in a familiar manner.

With regard to the flux conductors and the functionality of the electromagnetic actuator device 1 according to FIG. 2, the applicant's patent DE 102 40 774 and in particular the exemplary embodiment according to FIG. 1 are referred to. In contrast to the embodiment illustrated there, the displacing movement of the armature unit 7 from the parked position to the actuating position is supported by spring force by means of spring means 14, which in the drawing plane are supported at the top of the pole core 23, more precisely at the bottom of an axial blind bore in the pole core 23, and they do so directly, and are supported indirectly against the armature unit 7 at the other end, namely via rotation decoupling means 15 whose functionality corresponds to the rotation decoupling means 15 described in connection with FIG. 1. In contrast to the exemplary embodiment according to FIG. 1, the rotation decoupling means 15, more precisely the sliding bearing element forming said rotation decoupling means 15, are axially arranged between the spring means formed as helical compression springs and the armature unit 7 so as to prevent a rotational movement of the spring means 14 when the armature unit 7 rotates about the displacement axis V.

Figure 4:
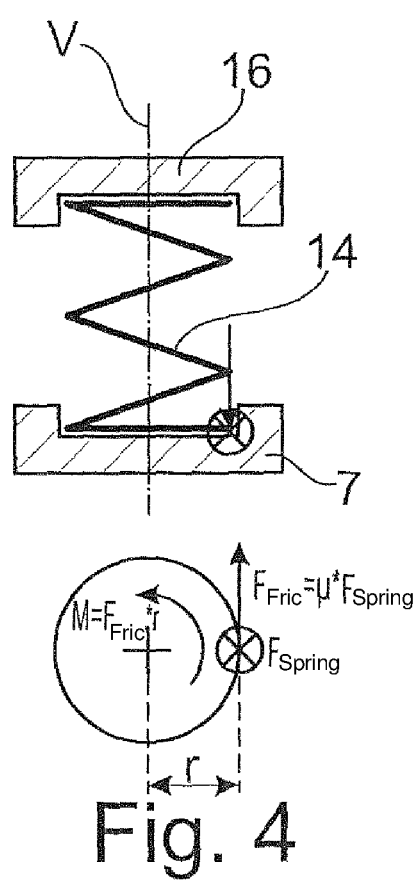
FIG. 4 illustrates a detail of an actuator device according to the state of the art without rotation decoupling means.

In FIG. 4, the problem generally arising in the state of the art is illustrated. It can be seen that spring elements 14 are directly supported against an abutment component 16 as well as directly against an armature unit 7. This leads to a friction force $F_{Fric}$ directly acting between the armature unit 7 and the spring means 14, said friction force corresponding to the spring force multiplied by the friction value between the spring means 14 and armature unit 7. This friction force $F_{Fric}$ also leads a torque M acting on the spring means 14 when the armature unit 7 is rotated about the displacement axis V, said torque M corresponding to the friction force $F_{Fric}$ multiplied by the distance r between the resting surface of the spring means 14 and the displacement axis V.

Figure 3:
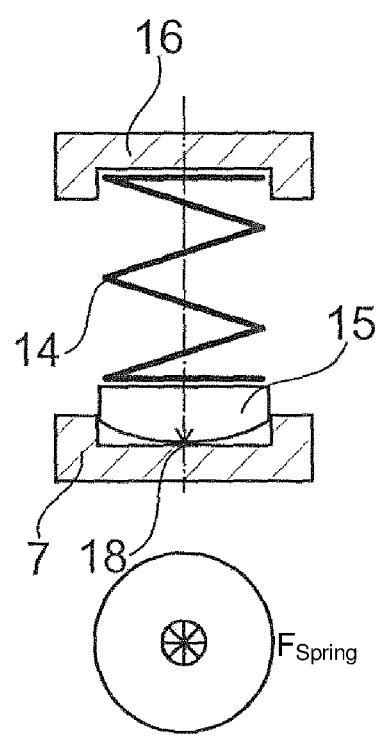
FIG. 3 illustrates a schematic view of a detail of an electromagnetic actuator device showing rotation decoupling means.

In contrast to FIG. 4, FIG. 3 illustrates the changed situation in an embodiment according, frontal rotation decoupling elements 15, which are realized in a sphere-like shape, being provided in this instance in an exemplary manner, namely axially between the spring means 14 and the armature unit 7, for example, said spring means 14 alternatively being able to be disposed between the spring means 14 and the abutment component 16, analogous to the exemplary embodiment according to FIG. 1. It is generally conceivable to provide rotation decoupling means 15 on both axial sides of the spring means 14.

It can be seen that essentially no torque is transferred from the rotating armature unit 7 to the rotation decoupling means or the spring means 14 arranged stationary thereto by means of the punctiform resting surface 18 of the rotation decoupling means 15.

LIST OF REFERENCES 1 electromagnetic actuator
2 yoke unit
3 first yoke section
4 spool unit
5 second yoke section
6 air gap
7 armature unit 8 air gap
9 permanent magnet section (permanent magnet means)
10 flux-conducting section
11 shunt element
12 air gap
13 air gap
14 spring means
15 rotation decoupling means (preferably designed as a sliding bearing)
16 abutment component
17 (sphere-like shaped) front side
18 resting surface
19 bore ground
20 blind bore
21 casing
22 yoke
23 pole core (also an abutment component in this instance)
24 pole disc
25 pole disc
V displacement axis
$F_{Fric}$ friction force
M torque
R distance

The invention claimed is:

1. An electromagnetic actuator device having at least one stationary spool unit (4), which is energizable, as well as at least one armature unit (7), which is movable along a displacement axis (V) and which is movable with respect to the spool unit (4) in reaction to the spool unit (4) being energized, said armature unit (7) being displaceable between a parked position and an actuating position in an output drive direction along the displacement axis (V) in order to interact with an actuating element, which is a camshaft and which is disposed on an output side of the armature unit (7), as well as being rotatable about the displacement axis (V), and spring means (14), which are supported against an abutment component (16) disposed in a torque-proof manner, being allocated to said armature unit (7) in such a manner that said spring means apply a spring force to the armature unit (7) during a displacing movement (V) in the output drive direction while simultaneously at least partially relaxing and apply a spring force to the armature unit (7) when in the actuating position as well, wherein
the spring means (14) are supported against the abutment component (16) by means of rotation decoupling means (15) for decoupling a rotational movement of the armature unit (7) from the spring means (14) about the displacement axis (V) at the armature unit (7) and/or against the abutment component (16) by means of rotation decoupling means (15) for decoupling a rotational movement of the spring means (14) about the displacement axis (V) from the abutment component (16).

2. The electromagnetic actuator device according to claim 1, wherein the rotation decoupling means (15) comprise at least one sliding bearing element.

3. The electromagnetic actuator device according to claim 2, wherein the at least one sliding bearing element is disposed in a torque-proof manner with respect to the spring means (14) and is supported against the armature unit (7) or against the abutment component (16).

4. The electromagnetic actuator device according to claim 2, wherein the sliding bearing element is formed in a sphere-like shape on a front side facing towards the armature unit (7) or the abutment component (16) and/or has a punctiform resting surface (18), for being supported against the armature unit (7) or the abutment component (16).

5. The electromagnetic actuator device according to claim 4, wherein the punctiform resting surface (18) is interspersed by the displacement axis (V).

6. The electromagnetic actuator device according to claim 2, wherein the sliding bearing element has an annular or disc-shaped resting surface (18) for being supported against the armature unit (7) or the abutment component (16).

7. The electromagnetic actuator device according to claim 1, wherein the spring means (14) comprise or are designed as a helical compression spring which is supported against the rotation decoupling means (15).

8. The electromagnetic actuator device according to claim 1, wherein the spring means (14) are disposed within an axial channel of the armature unit (7) in sections.

9. The electromagnetic actuator device according to claim 1, wherein permanent magnet means (9) assigned to the armature unit (7) and disposed so as to be displaceable with said armature unit (7) or stationary are provided and hold the armature unit (7) in the parked position, and wherein the magnetic holding force of the permanent magnet means (9) can be reduced by energizing the spool unit (4) such that the armature unit (7) is discplaceable in the output drive direction by means of the spring means (14).

10. The electromagnetic actuator device according to claim 1, wherein the rotation decoupling means (15) are made of non-magnetic material.

11. The electromagnetic actuator device according to claim 10, wherein the rotation decoupling means (15) are made of metal or plastic.

12. A system comprising an electromagnetic actuator device according to claim 1, as well as an actuating element adapted to apply a force on the armature unit (7), which rotates the armature unit (7) about its displacement axis (V), when in its actuating position.

13. The system according to claim 12, wherein the electromagnetic actuator device is bistable.

14. The system according to claim 12, wherein the actuating element is adapted to apply a force on the armature unit (7) which rotates the armature unit (7) about its displacement axis (V), when extracted from an actuator casing.

15. The system according to claim 12, wherein the system is a cam phasing system and the actuating element is a camshaft, which comprises an engagement groove for the armature unit (7) and which causes the force, which acts on the armature unit (7) so as to rotate the armature unit (7) about the displacement axis (V), by means of the rotation of the camshaft owing to the friction arising between the camshaft and the armature unit (7) when in their actuating position.

* * * * *